United States Patent [19]

Bryan et al.

[11] Patent Number: 4,990,303
[45] Date of Patent: Feb. 5, 1991

[54] ELEMENT WITH BURNABLE POISON COATING

[75] Inventors: William J. Bryan, Granby; Nathan Fuhrman, Plainville, both of Conn.; David C. Jones, Austin, Tex.

[73] Assignee: Combustion Engineering, Inc., Windsor, Conn.

[21] Appl. No.: 211,182

[22] Filed: Jun. 24, 1988

[51] Int. Cl.⁵ .............................................. G21C 3/00
[52] U.S. Cl. ..................................... 376/419; 376/457
[58] Field of Search ............... 376/419, 457; 252/634, 252/635; 427/419.3, 419.4, 419.7, 380, 213.35

[56] References Cited

U.S. PATENT DOCUMENTS

| | | | |
|---|---|---|---|
| 4,297,246 | 10/1981 | Cairns | 252/465 |
| 4,683,114 | 7/1987 | Ho | 376/419 |
| 4,695,476 | 9/1987 | Feild | 427/6 |
| 4,717,534 | 1/1988 | Morita | 376/419 |
| 4,762,675 | 8/1988 | Feild | 376/414 |
| 4,783,311 | 11/1988 | Ferrari | 376/417 |

*Primary Examiner*—Donald P. Walsh
*Attorney, Agent, or Firm*—John H. Mulholland

[57] ABSTRACT

A fuel element for a nuclear reactor having a zirconium-tin alloy cladding tube, with a thin coating of particles of enriched boron-containing compound burnable poison particles, deposited from a liquid sol-gel which includes a glass binder material.

6 Claims, 2 Drawing Sheets

ELEMENT WITH BURNABLE POISON COATING

BACKGROUND OF THE INVENTION

This invention relates to nuclear fuel elements and, in particular, the provision of fuel elements with a burnable poison coating in the form of a thin layer of a boroncontaining alloy on the inside of a cladding tube. The burnable poison is a residue of an alkali metal borate glass deposited inside of a zirconium-alloy cladding tube by sol-gel technology.

A nuclear fuel element of the type involved in the invention is part of a fuel assembly. Heretofore, typically, fuel assembly designs have employed fixed lattice burnable poison rods to control early-in-life reactivity and power peaking. These rods have become a necessary design feature for the fuel management of first cores of light water reactors as well as in schemes to achieve extended burnups and reduced radial neutron leakage. Such rods displace fuel rods within the assembly lattice which increases the core average linear heat generation rate and local peaking factors.

Alternate approaches have been proposed that place burnable poison material inside the fuel rods so that much less fuel material is displaced, for example, as boride coatings on the $UO_2$ pellets. Such coatings, however, while adhering when first applied, tend to spall off under the stresses of the irradiation environment in the nuclear reactor core, in part because of difficulty in matching the thermal expansion behavior of the coating to that of the fission material or $UO_2$ pellet. Attempts to incorporate boron compounds as mixtures within the $UO_2$ pellets have not been successful because of volatilization of boron species during high temperature fabrication processes and redistribution of the boron under irradiation.

U.S. Pat. No. 3,625,821 discloses an electroplated inside tube coating of a matrix metal and boron compound of, for example, nickel, iron manganese or chrome. Boron nitride (BN), titanium boride ($TiB_2$) and zirconium boride ($ZiB_2$) are specifically named. Electroplating boron compounds onto the Zircaloy substrate, as described in U.S. Pat. No. 3,625,821, has been shown to cause the substrate to hydride. This pickup of hydrogen causes the material to embrittle, thereby effecting its physical properties.

U.S. Pat. No. 4,695,476 shows vapor deposition of volatized boron compounds on the inside of fuel rod cladding.

For further background, see U.S. Pat. Nos. 3,925,151; 4,372,817; 4,560,575; 4,566,989; 4,582,676; 4,587,087; 4,587,088; and 4,636,404.

SUMMARY OF THE INVENTION

The invention involves an improved fuel element with a burnable poison coating which substantially overcomes problems of spalling and coating integrity because of the closely matched thermal expansion coefficients of the substrate and coating material and the action of fission sintering to enhance adhesion of the coating to the substrate.

The invention includes coating a thin layer of a boron-containing glass on the inside surface of the zirconium alloy cladding tube of the fuel rod. The preferred boron-containing glass compounds are $20Li_2O \cdot 80 B_3)_3$ or $15Na_2O \cdot 85B_2O_3$ because their thermal expansion coefficient most nearly matches that of the Zirconium-tin alloy cladding tube. The adhesion between the coating or residue and cladding, therefore, is less likely to deteriorate under irradiation than would similar coatings on the $UO_2$ pellets.

A suitable thin residue layer or coating of the boron-containing glass compound on the inside surface of the cladding tube is applied by using standard sol-gel technology.

In actual coating of Zircaloy tubes, they would be filled with the sol-gel liquid of the proper viscosity. The liquid would then be drained slowly out the bottom leaving a coating on the wall. Selected areas of the tube could be blanked off, if desired, by previously applying a wax or silicone resist coating. The solvent remaining in the coating would be removed by flowing warm air through the tube. Following this the residue or coating would be sintered by passing the Zircaloy tube through a tube furnace at 400° C.

DETAILED DESCRIPTION

Figure 1:
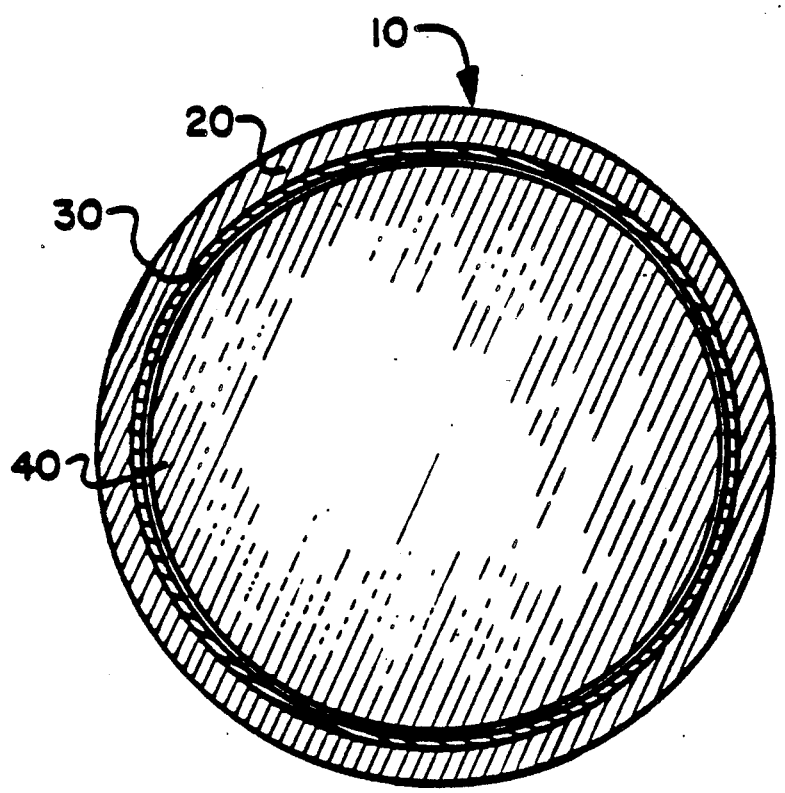
FIG. 1 is a cross-sectional view of a fuel element with a burnable poison coating made according to the principles of the invention.

The numeral 10 generally indicates a fuel element constructed according to the principles of the invention for use in a nuclear reactor. The fuel element includes a zirconium-tin alloy cladding tube 20, a boron-containing glass compound coating or sol-gel residue 30 on the inside of the zirconium-tin alloy cladding tube and pellets 40 of fissionable materials such as $UO_2$.

Lithium or sodium methoxide is dissolved in methanol, with a typical weight ratio of 1:20, by stirring in a closed container. Then a mixture of tetraethoxysilane and acidic aqueous solution (nitric acid ($HNO_3$) in a 5 to 7, typically 6, weight percent concentration) is added to this lithium solution. The mole ratio of lithium or sodium methoxide to tetraethoxysilane is around 6:1. A reflux of the solution will be performed at a temperature range of 50–80° C. (typically 70 ° C.) for a few hours, typically four, to achieve a partial hydrolysis of tetraethoxysilane. The mole ratio of water to tetraethoxysilane is 6:1. Now, tri-n-butylborate with is added slowly to the pre-hydrolyzed solution with constant stirring. ($B^{10}$ makes up substantially all of the boron in the tri-n-butylborate.) Another reflux of the solution will be carried out at a temperature range of 50–80° C. for a few more hours, typically four.

Before the application of coating, the solution may be further diluted with 2 volume parts of methanol to approximately 1 volume part of solution, depending on the coating thickness requirement. The coating may be applied in any convenient manner; a multiple application may be needed for a thick coating. Other factors for controlling the coating thickness are the rates of application, viscosity of solution, and temperature.

At the completion of coating, a heat-treatment of coated sample at 100–150° C., (typically 125 °C.) is performed in an oxidizing atmosphere to drive off volatiles. Then the completion of hydrolysis is accomplished at 200–250° C. (typically 225° C.) in a humid atmosphere. A subsequent heat treatment around 300 ° C is for burn-off of unreacted organics. After a final heat treatment at 400° C., the preparation of B residue or coating on the Zircaloy tube is completed.

Figure 2:
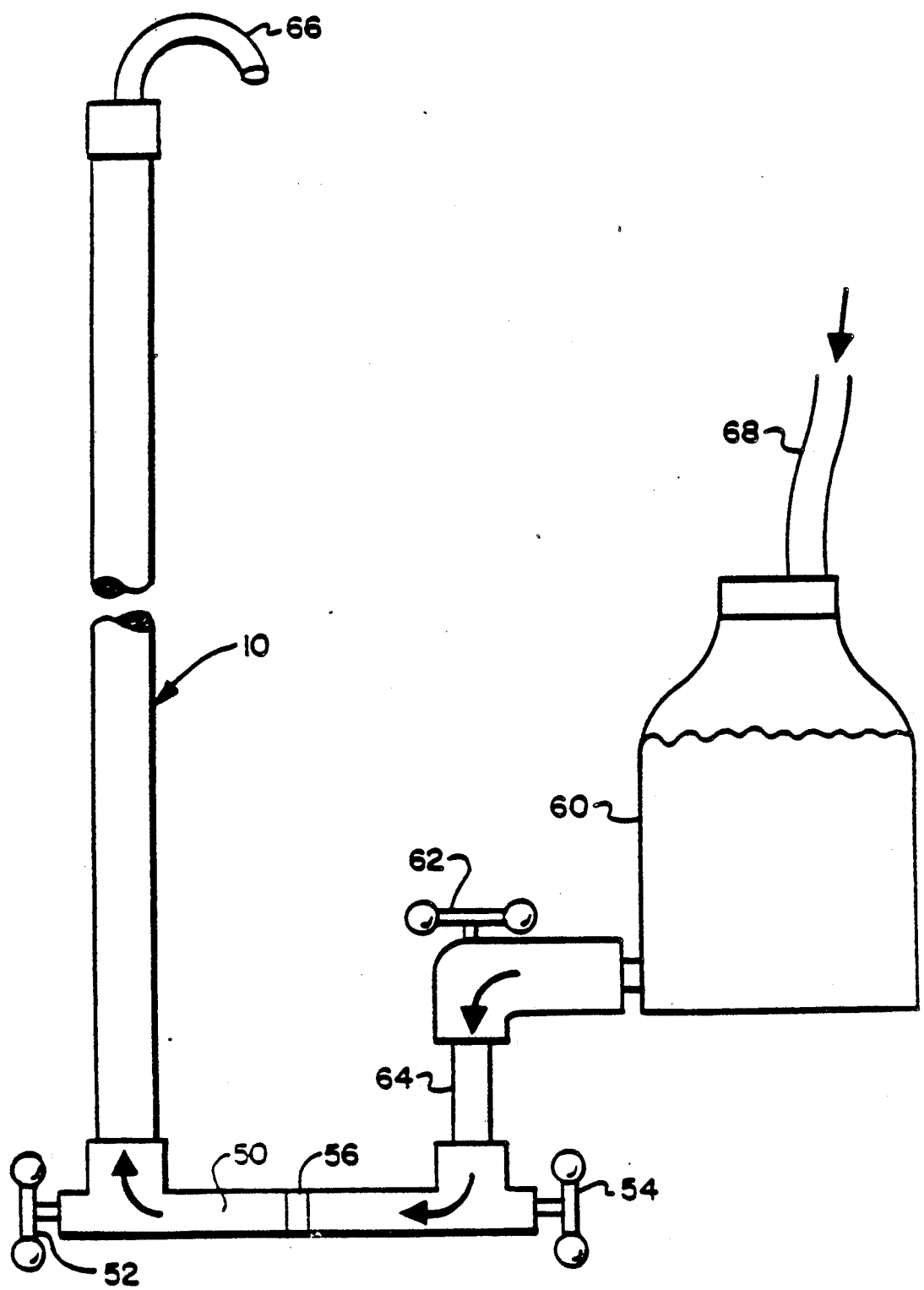
FIG. 2 is a schematic view of the apparatus used for providing the burnable poison coating on the inside of the cladding tube of the fuel element of the invention.

The coating process as illustrated in FIG. 2 includes a process by which the liquid sol-gel is pumped upward into the cladding tube 10 while the tube is in the vertical position. The schematic arrangement of FIG. 2 shows that the hollow tube 10 is attached at its lower end by means of a hose and valve connector apparatus 50 having a valve 52 at the lower end of the tube 10 and a valve 54 adjacent its inlet port from a source of the liquid suspension. The connector 50 has a drain 56 between the two valves 52 and 54. A source of the liquid suspension schematically illustrated as a container of liquid 60 has a valve 62 connected by a conduit 64 to the connector 50 through its valve 54. A tube 68 provides a source of high pressure argon or other suitable gas pressurize the container 60 of the liquid suspension. the over-pressure of argon gas is used to pump the liquid up the tube 10 with the valves 62, 54 and 52 open. Air is exhausted from the tube 10 through an upper vent tube 66. The liquid suspension is held in the tube 10 by means of valve 52 approximately 1 minute. The liquid is then drained at a controlled rate manually controlling the valve 52. A rapid drain rate would result in the formation of a very thin coating, whereas the slower drain rate would produce coatings that would be thick and more irregular.

The tube 10 is made of a zirconium-tin alloy which is commonly called Zircaloy-2 or Zircaloy-4. The compositions of Zircaloy-2 and Zircaloy-4 are shown in Table I, but it should be realized that each will contain some other impurities within tolerance limits known to those skilled in the art. Table I shows the alloying constituents and it should be remembered that the remainder is zirconium and that all ranges are given in percent by weight. Thus, it will be seen that the invention provides a nuclear fuel element having a burnable poison coating or residue in the form of a thin layer of boron-containing compound particles on the inside of the cladding tube in a manner which provides a matched thermal expansion coefficient between the cladding tube substrate and the coating to prevent spalling and which provides an adhesion promoting sintering phenomenon from the irradiated environment. The use of these improved elements eliminate the requirement of displacing fuel rods within the assembly lattice and therefore minimizes the fuel material that is displaced in the nuclear reactor core.

TABLE I

| ZIRCONIUM-TIN ALLOY (% BY WEIGHT) | | | | |
|---|---|---|---|---|
| | Zircaloy-2 | | Zircaloy-4 | |
| | Range | Typical | Range | Typical |
| Tin | 1.20 to 1.70 | 1.55 | 1.20 to 1.70 | 1.53 |
| Iron | 0.07 to 0.20 | 0.14 | 0.18 to 0.24 | 0.22 |
| Chromium | 0.05 to 0.15 | 0.08 | 0.07 to 0.13 | 0.10 |
| Nickel | 0.03 to 0.08 | 0.06 | — | — |
| Niobium (columbium) | — | | — | |
| Oxygen | A | A | A | A |
| Iron + chromium + nickel | 0.18 to 0.38 | 0.28 | — | 0.32 |
| Iron + chromium | — | | 0.28 to 0.37 | |

The remainder is zirconium and impurities within tolerable amounts.

We claim:

1. In a fuel element for use in a nuclear reactor which includes a fissionable material contained within a zirconium-alloy cladding tube, the improvement which comprises: a coating on the inside of the zirconium-alloy cladding tube, said coating including a boron-containing glass compound.

2. The fuel element of claim 1 in which the coating's boron-containing compound includes boron enriched to at least a 80% level of to give a desired nuclear poison level for use in the nuclear reactor.

3. The fuel element of claim 1 in which the coating's boron-containing compound includes $15Na_2O \cdot 85B_2O_3$ or $20Li_2O \cdot B_2O_3$.

4. The fuel element of claim 1 in which the zirconium-alloy includes tin in the approximate range of from 1.20 to 1.70.

5. The fuel element of claim 1 in which the coating is a residue of a sol-gel.

6. The fuel element of claim 1 in which the coating is a residue of a sol-gel that has been heated to approximately 400 ° C.

* * * * *